Nov. 6, 1945.  W. V. HOBBS  2,388,542
PRESSURE MEASURING DEVICE
Filed May 15, 1944
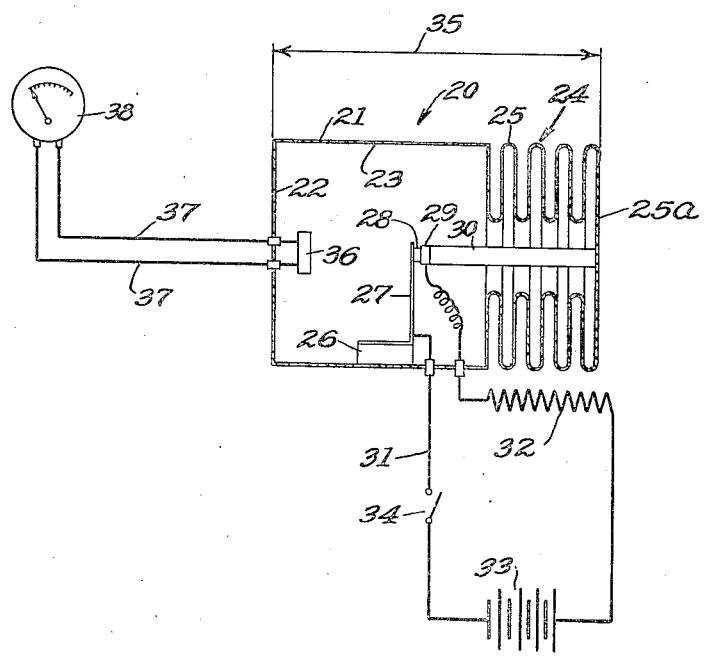
INVENTOR
Walter V. Hobbs
BY
Warren H. F. Schmieding
ATTORNEY Patented Nov. 6, 1945

2,388,542

UNITED STATES PATENT OFFICE 2,388,542

PRESSURE MEASURING DEVICE

Walter V. Hobbs, Columbus, Ohio, assignor to Ranco Incorporated, Columbus, Ohio, a corporation of Ohio Application May 15, 1944, Serial No. 535,655

7 Claims. (Cl. 73—410)

This invention relates to measuring apparatus and is particularly directed to instruments for measuring pressure in the determination of altitudes, depths of liquids and similar conditions.

An object of this invention is to provide an instrument for measuring pressure and indicating that pressure at a remote location.

Another object is to provide an instrument for measuring pressure and transmitting the measurements to another location electrically so that it will merely be necessary to extend one or more wires from the point where the measuring operations are performed to the point where the indications are recorded or read.

Another object of the invention is to provide a measuring device embodying a cell which is responsive to the pressures to be measured and to arrange means adjacent the cell to tend to maintain the cell in a predetermined condition in opposition to potential changes caused by pressure variations, the cell also having associated with it suitable means responsive to the force necessary to maintain the condition to transmit indications to an indicator located remotely from the cell.

Another object is to provide a measuring device having a hermetically sealed expansible cell containing a gas or vapor which is affected by temperature changes and locating a heat exchange element adjacent the cell, movement of the cell in response to volumetric changes due to temperature variations caused by the operations of the heat exchanger serving to control the supply of an operating medium to the heat exchange element whereby the element will tend to operate to maintain the cell in a predetermined condition, means for measuring the energy required to maintain the condition being associated with the cell to indicate the force tending to change the condition, namely the pressure surrounding the cell.

An object also consists in providing a pressure measuring device embodying a hermetically sealed cell with a stationary wall and a wall which is movable in response to the expansion and contraction of a gas or vapor within the cell, cooperating contacts being actuated by the movable wall to control the supply of current to a resistance heater employed to expand the vapor within the cell, the amount of heat necessary to effect such expansion being measured to show the magnitude of the force tending to resist such expansion.

Further objects and advantages of the present invention will be apparent from the following description, reference being had to the accompanying drawing wherein a preferred form of embodiment of the invention is clearly shown.

In the drawing:

The figure is a diagrammatic view of a pressure measuring instrument embodying the features of the present invention.

In carrying out this invention, it is proposed to provide a cell 20 which may be formed of any suitable material and is provided with a substantially rigid section 21 including an end wall 22 and side walls 23. Preferably, the side walls 23 are portions of a cylinder for convenience in manufacture of the cell. At one end, the side wall is secured to the end wall 22 and at the other end has a movable wall section 24 secured thereto. In the present instance, the movable wall section is formed to include a bellows 25 which may expand and contract in response to variations in internal or external pressure. The bellows 25 is so secured to the side wall that a hermetic seal results which will retain a gas or vapor within the cell, the gas or vapor being expansible in response to increases in temperature.

The rigid section 21 has a mounting 26 secured thereto from which a resilient arm 27 projects toward the center of the cell 20. This arm carries a contact 28 at its outer end which contact is engaged when the cell is subject to normal conditions, by a similar contact 29 carried at the free end of a finger 30 projecting from the end wall 25A of the bellows 25. The contacts 28 and 29 are arranged in an electric circuit 31 which includes a resistance heater 32 and a source of electrical energy such as the battery 33. When the contacts are engaged, as illustrated in the drawing, and the main switch 34 is closed, the circuit 31 is completed and current will flow from the battery to the resistance heater causing it to generate heat. This heat will be transmitted to the cell 20 due to the close proximity of the heater 32 thereto, causing the gas or vapor in the cell 20 to expand. When sufficient expansion has occurred, the bellows 25 will be extended causing the finger 30 and contact 29 to move away from the contact 28. When these contacts 28 and 29 separate, the circuit 31 will be broken and the heater 32 will cease to operate. The gas will then cool and contract causing the bellows 25 to collapse and move the finger 30 and contact 29 toward contact 28. When these contacts again engage one another, the circuit 31 will be closed and the above operation will be repeated.

The tendency of this apparatus is to maintain a constant distance, indicated by the arrow 35, between the ends 22 and 25A of the cell. In the event the cell 20 is exposed to a compressive force, either through the application of external pressure or a mechanical force, the bellows 25 will tend to collapse and force the finger 30 farther into the rigid section of the cell. The resiliency of the arm 27 will permit this movement to avoid injury to the mechanism. Since the contacts will be in engagement, however, the heater 32 will be energized to deliver heat to the cell to cause the gas or vapor to expand and counteract the collapse of the bellows 25. As previously mentioned, when the internal pressure is sufficient to extend the bellows 25 until the contacts separate, the heater will be de-energized to permit the vapor within the cell to cool. Due to this arrangement, the cell will hunt a point of equilibrium which is illustrated by the arrow 35. If the external pressure is high, more heat will be required within the cell to cause the medium therein to exercise sufficient force to counteract the external pressure. Therefore, by measuring the heat within the cell, the force tending to collapse the cell may be determined. To measure the heat within the cell, the rigid section is provided with a temperature measuring element 36 such as a thermocouple or platinum resistance element, the electrical characteristics of which are affected when the elements are subjected to changing temperatures. The temperature measuring element 36 is connected by leads 37 with an indicator 38 of any suitable type located at any desired point relative to the cell, which indicator 38 will show the effect of changing temperatures on the measuring element 36. If desired the indicator 38 may be calibrated in pressure units to show directly the external pressures applied to the cell 20. It will be seen that as the external pressures increase, the internal temperature must also be increased to maintain the constant distance between the end walls of the cell. It is also proposed to operate the instrument at a sufficiently high temperature that it will cool rapidly when the heater 32 is de-energized.

From the foregoing, it will be apparent that since the only impulses transmitted from the cell 20 to the indicator 38 are electrical impulses, it will be unnecessary to have any connections other than wires extending between these elements. The measuring instrument is, therefore, highly suitable for use in aircraft or in other locations where weight, and space are at a premium.

While the form of embodiment of the present invention as herein disclosed constitutes a preferred form, it is to be understood that other forms might be adopted, all coming within the scope of the claims which follow:

I claim:

1. Pressure measuring mechanism comprising in combination, a sealed cell having a stationary and a movable wall; coacting means carried by said walls; means for heating said cell, controlled by said coacting means; and means for measuring the temperature within said cell.

2. Pressure measuring mechanism comprising in combination, a sealed cell having a stationary and a movable wall; coacting contact means carried by said walls; resistance means for heating said cell, said resistance means having a circuit containing a source of current; movement of the movable wall of said cell causing engagement and disengagement of said contact to control the operation of said heating means; and means for measuring the temperature within said cell.

3. Pressure measuring mechanism comprising in combination, a cell having a stationary wall and bellows means hermetically joined thereto; fluid means disposed in said cell, said fluid being expansible under the influence of heat; a contact carried by said stationary wall; a complemental contact mounted on said bellows means, said contact engaging and separating in response to movement of said bellows; electrical heating means adjacent said cell, said heating means having a circuit including a source of electrical energy and said contacts; and means for measuring the temperature within said cell.

4. Pressure measuring mechanism comprising in combination, a cell having a stationary wall and bellows means hermetically joined thereto; fluid means disposed in said cell, said fluid being expansible under the influence of heat; a contact carried by said stationary wall; a complemental contact mounted on said bellows means, said contact engaging and separating in response to movement of said bellows; electrical heating means adjacent said cell, said heating means having a circuit including a source of electrical energy and said contacts; means in said cell affected by temperature changes therein; and means disposed remotely from said cell for measuring the effect of the temperature changes on said means within said cell.

5. Pressure measuring mechanism comprising in combination, a cell having a stationary wall and bellows means hermetically joined thereto; fluid means disposed in said cell, said fluid being expansible under the influence of heat; a contact carried by said stationary wall; a complemental contact mounted on said bellows means, said contact engaging and separating in response to movement of said bellows; electrical heating means adjacent said cell, said heating means having a circuit including a source of electrical energy and said contacts; means in said cell for generating an electric current in response to temperature changes in said cell; and means connected with said current generating means for measuring the current generated thereby.

6. Pressure measuring apparatus comprising, in combination, an expansible cell; means for varying the temperature within said cell to tend to change a dimension thereof; means responsive to the change in dimension of said cell for controlling said temperature varying means; and means for measuring the temperature within said cell.

7. Pressure measuring apparatus comprising, in combination, an expansible cell; means for varying the temperature within said cell to cause a portion thereof to move; means responsive to the movement of said cell to control the operation of said temperature varying means; and means for indicating the temperature within said cell at a remote location.

WALTER V. HOBBS.